(12) United States Patent
Chechik et al.

(10) Patent No.: US 9,659,056 B1
(45) Date of Patent: May 23, 2017

(54) PROVIDING AN EXPLANATION OF A MISSING FACT ESTIMATE

(71) Applicant: GOOGLE INC., Mountain View, CA (US)

(72) Inventors: Gal Chechik, Los Altos, CA (US); Yaniv Leviathan, Tel Aviv (IL); Ran El Manor, Savyon (IL); Yoav Tzur, Tel Aviv (IL); Eyal Segalis, Tel Aviv (IL); Efrat Farkash, Givataym (IL); Yossi Matias, Tel Aviv (IL)

(73) Assignee: Google Inc., Mountain View, CA (US)

( * ) Notice: Subject to any disclaimer, the term of this patent is extended or adjusted under 35 U.S.C. 154(b) by 461 days.

(21) Appl. No.: 14/143,904

(22) Filed: Dec. 30, 2013

(51) Int. Cl.
*G06F 17/30* (2006.01)

(52) U.S. Cl.
CPC .............................. *G06F 17/30424* (2013.01)

(58) Field of Classification Search
CPC ................................................ G06F 17/30424
See application file for complete search history.

(56) References Cited

U.S. PATENT DOCUMENTS

| | | | |
|---|---|---|---|
| 7,389,288 B2 * | 6/2008 | Chickering | ............ G06Q 10/02 |
| 7,502,770 B2 | 3/2009 | Hillis et al. | |
| 7,587,387 B2 | 9/2009 | Hogue | |
| 7,672,937 B2 | 3/2010 | Madhavan et al. | |
| 7,765,206 B2 | 7/2010 | Hillis et al. | |
| 7,769,579 B2 | 8/2010 | Zhao et al. | |
| 7,774,328 B2 | 8/2010 | Hogue et al. | |
| 7,792,837 B1 | 9/2010 | Zhao | |
| 7,925,610 B2 | 4/2011 | Elbaz et al. | |
| 8,051,104 B2 | 11/2011 | Weissman et al. | |
| 8,122,026 B1 | 2/2012 | Laroco, Jr. et al. | |
| 8,204,856 B2 | 6/2012 | Meyer et al. | |
| 8,271,480 B2 | 9/2012 | Diab et al. | |
| 8,370,128 B2 | 2/2013 | Brun et al. | |
| 2008/0306934 A1 | 12/2008 | Craswell et al. | |
| 2009/0094211 A1 | 4/2009 | Marvit et al. | |
| 2010/0121839 A1 | 5/2010 | Meyer et al. | |

(Continued)

FOREIGN PATENT DOCUMENTS

| WO | 00/14651 A1 | 3/2000 |
|---|---|---|
| WO | 2010/085523 A1 | 7/2010 |

OTHER PUBLICATIONS

Kersting, et al, "Counting Belief Propagation", UAI 2009, pp. 277-284 (8 pages).

(Continued)

*Primary Examiner* — Kris Andersen
(74) *Attorney, Agent, or Firm* — Brake Hughes Bellermann LLP

(57) ABSTRACT

Systems and methods are disclosed for providing an explanation of an estimate for information missing from a data graph. An example method may include receiving a query that requests information for a first entity and receiving an estimate for the information, the estimate being based on a plurality of features of a joint distribution model. The method may include determining respective contribution scores for the plurality of features, selecting a quantity of the features with highest contribution scores, generating, using the selected quantity of features, an explanation for the estimate; and providing the explanation and the estimate as part of a search result for the query.

18 Claims, 7 Drawing Sheets

(56) References Cited

U.S. PATENT DOCUMENTS

| | | | |
|---|---|---|---|
| 2011/0040776 A1 | 2/2011 | Najm et al. | |
| 2012/0030164 A1* | 2/2012 | Gutlapalli | G06F 17/30864 707/603 |
| 2014/0025660 A1* | 1/2014 | Mohammed | G06F 17/30554 707/722 |

OTHER PUBLICATIONS

Lardinois, "Google's Knowledge Graph Now Explains Connections Between Your Query and Items in 'People Also Search For' Section", TechCrunch, Oct. 19, 2012, 6 pages.

Mayfield, et al, "ERACER: A Database Approach for Statistical Inference and Data Cleaning", SIGMOD '10, Jun. 6-11, 2010, 12 pages.

Yedidia, et al, "Understanding Belief Propagation and its Generalizations", Mitsubishi Electric Research Laboratories, Nov. 2001, 36 pages.

"Automatic Summarization", from Wikipedia, the free encyclopedia, retrieved from http://en.wikipedia.org/wiki/Automatic_summarization, Feb. 25, 2013, 12 pages.

"Concept Mining", from Wikipedia, the free encyclopedia, retrieved from http://en.wikipedia.org/wiki/Concept_mining, Apr. 1, 2012, 2 pages.

"Personalization", from Wikipedia, the free encyclopedia, retrieved from http://en.wikipedia.org/wiki/Personalization, Feb. 26, 2013, 6 pages.

Lao, et al., "Random Walk Inference and Learning in a Large Scale Knowledge Base", Conference on Empirical Methods in Natural Language Processing, 2011, 11 pages.

Lao, et al., "Relational Retrieval Using a Combination of Path-Constrained Random Walks", Mach Learn, vol. 81, Jul. 22, 2010, pp. 53-67.

Lao, Ni, "Efficient Random Walk Inference with Knowledge Bases", Thesis, The Carnegie Mellon University, Jul. 2012, 139 pages.

Lao, et al., "Reading the Web with Learned Syntactic-Semantic Inference Rules", Proceedings of the 2012 Joint Conference on Empirical Methods in Natural Language Processing and Computational Natural Language Learning, 2012, 10 pages.

Singh, et al., "Large-Scale Cross-Document Coreference Using Distributed Inference and Hierarchical Models", Proceedings of the 49th Annual Meeting of the Association for Computational Linguistics: Human Language Technologies, vol. 1, 2011, 11 pages.

Lao, et al., "Fast Query Execution for Retrieval Models Based on Path-Constrained Random Walks", KDD '10, Jul. 25-28, 2010, pp. 881-888.

Extended European Search Report for European Patent Application No. 14000643.8, mailed on May 26, 2014, 6 pages.

Kahng, et al., "Ranking Objects by Following Paths in Entity-Relationship Graphs", PIKM '11, Oct. 28, 2011, 8 pages.

\* cited by examiner

PROVIDING AN EXPLANATION OF A MISSING FACT ESTIMATE

BACKGROUND

Relational models of knowledge, such as a graph-based data store, can be used to provide answers to search queries. Such models describe real-world entities (people, places, things) and facts about these entities in the form of graph nodes and edges between the nodes. While such graphs may represent a significant amount of facts, even the largest graphs may be missing tens of millions of entities, or may have incorrect facts for some of the entities. For example, dates or other attributes can often be missing for a given entity.

SUMMARY

Facts missing from a relational model of knowledge often can be inferred based on other related facts in the graph. For example, a search system may learn that in 70 percent of marriages, the husband and wife are within 5 years of age. Using this distribution, the system can estimate with high confidence that a man whose birthdate is unknown, but whose wife's birthdate is known, is most likely within 5 years of the age of his wife. While this example uses one piece of supporting evidence (called a feature), the age of the spouse, estimates of missing or incorrect facts are often more complex and can be based on several, even hundreds, of such features. Some implementations provide a search interface that provides an estimate for a missing fact as well as a human-readable explanation of the basis for the estimate. For example, a search system may use the joint distribution of a plurality of features to generate an estimate for information requested by a query that cannot be directly obtained from a data graph. Each feature may represent a fact related to the missing information. The system may apply a set of measures against the features to determine which features and combination of features strongly influence the estimate and select a small quantity of the features for an explanation that is displayed to the query requester. The quantity of features used in the explanation may depend on the strength or the type of the features or its non-linear relation to other features. In one implementation, the system may use templates to provide the human-readable explanation of the estimate.

In one aspect, a computer system includes at least one processor and memory storing a data graph and instructions that, when executed by the at least one processor, cause the system to receive a query that requests information for a first entity, and generate an estimate for the requested information using known information from the data graph for second entities related to the first entity in the data graph. The instructions may also include instructions that cause the system to generate, from the known information used to determine the estimate, an explanation for the estimate based on the known information deemed influential to the estimate, and provide the explanation and the estimate as part of a search result for the query. For example, when the first entity is a person, a second entity is a spouse of the person, the known information can include an age or a birthdate of the spouse.

These and other aspects can include one or more of the following features. For example, the known information may be based on features in a joint distribution model. As another example, the explanation may be based on one or more templates associated with a type of relationship between the first entity and one or more of the second entities.

As another example, the memory may further stores instructions that, when executed by the at least one processor, cause the system to determine that the information for the first entity is absent from the data graph, generate the estimate in response to the determination, and store the estimate and the known information used to determine the estimate as nodes in the data graph. In some implementations, the known information deemed influential is stored in the data graph with the estimate and the known information that is not deemed influential is not stored in the data graph. In some implementations the known information can include a plurality of features and each feature may have a corresponding contribution score. When a feature has a corresponding contribution score, the memory can further store instructions that, when executed by the at least one processor, cause the system to calculate a contribution score for a first feature by determining a first estimate for the information using the first feature, determining a second estimate for the information without using the first feature, and basing the contribution score on a difference between the first estimate and the second estimate. Instead, or in addition, the memory can further stores instructions that, when executed by the at least one processor, cause the system to: determine a highest contribution score and its corresponding feature, determine that the highest contribution score meets a threshold, and use the known information for the feature in the explanation. In some implementations, the memory further stores instructions that, when executed by the at least one processor, cause the system to determine a highest contribution score and its corresponding first feature and a second-highest contribution score and its corresponding second feature, combine the highest contribution score and the second-highest contribution score, and determine that the combined contribution score meets a threshold and use the first feature and the second feature in the explanation. In some implementations, the estimate is generated and stored prior to receiving the query.

In another aspect, a computer-implemented method includes determining, using at least one processor, that information for an entity is absent from a data graph and determining, using the at least one processor, an estimate for the information based on a plurality of features from a joint distribution model related to the information. The method also includes selecting a subset of the plurality of features, receiving, using the at least one processor, a query that requests the information for the entity, generating an explanation based on the subset of features, and providing the explanation and the estimate as part of a search result for the query. In some implementations, the method may further include storing members of the subset and the estimate as nodes in the data graph, the estimate linked to the entity and the members linked to the estimate.

These and other aspects can include one or more of the following features. For example, selecting the subset can include determining a contribution value for each of the plurality of features, selecting a feature with a highest contribution value when the highest contribution value meets a threshold, and selecting a quantity of features with highest contribution values when the combination of the contribution values meets the threshold. In such an implementation, determining the contribution value for a particular feature can include determining a first estimate for the information using the particular feature, determining a second estimate for the information without using the particular feature, and determining a difference between the first estimate and the second estimate. In addition, the contribution value for a particular feature may be related to a statistical descriptor associated with the particular feature.

As another example, when the subset is a first subset selecting the subset can include determining a contribution value for each of the plurality of features, determining that a second subset of the features are related, aggregating the contribution values for the features in the second subset, and selecting the second subset as the first subset, so that the explanation and estimate reflect the aggregation. In another example, the query is received prior to determining that the information is absent, and the determining is performed in response to receiving the query. In some implementations, the method may include analyzing search records to determine that the information has previously been requested for other entities; and determining whether the information is absent for the entity in response to determining that the information has previously been requested.

In another aspect, a method includes receiving, using at least one processor, a query that requests information for a first entity and receiving an estimate for the information, the estimate being based on a plurality of features of a joint distribution model. The method also includes determining, using the at least one processor, respective contribution scores for the plurality of features, selecting, using the at least one processor, a quantity of the features with highest contribution scores, generating, using the selected quantity of features, an explanation for the estimate, and providing the explanation and the estimate as part of a search result for the query. In some implementations, one of the selected features is an aggregated feature.

In another aspect, a non-transitory computer-readable medium may include instructions executable by at least one processor that cause a computer system to perform one or more of the methods described above.

One or more of the implementations of the subject matter described herein can be implemented so as to realize one or more of the following advantages. As one example, the search interface with the estimate explanation gives users a sense of understanding about the estimate and a basis to believe, or not believe, the estimate, which enhances the user's search experience. Implementations also easily scale because the system can automatically determine influential features and identify features that can be estimated by a joint distribution model. Thus, the system does not rely on manually entered or maintained lists.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
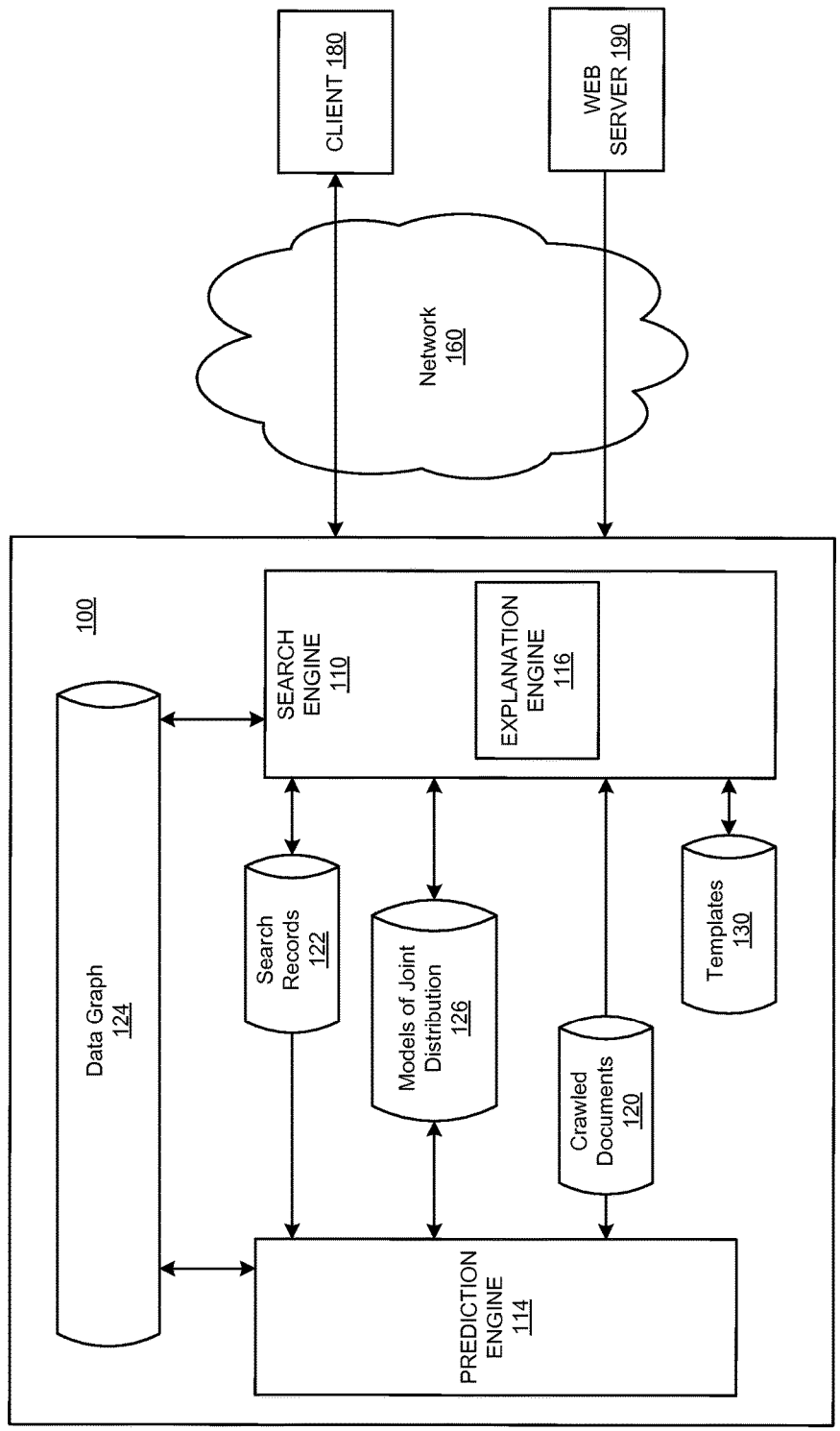
FIG. 1 illustrates an example system in accordance with the disclosed subject matter.

FIG. 1 is a block diagram of an estimate explanation system in accordance with an example implementation. The system 100 may be used to select distribution features used to provide a human-readable explanation of the basis for an estimate the system provides for information that is missing from a data graph. The estimate may be based on the joint distribution of one or more features, which represent facts in the data graph that are related to the missing information. The system 100 may also be used to store the estimates and the influential features used to generate the estimates, which reduces query response time. In some implementations, the system 100 can generate an estimate and its explanation from a very large data graph, e.g., one with millions of entities and even more edges. While system 100 in FIG. 1 is described as an Internet search system, other configurations and applications may be used. For example, the system may be used in any circumstance where estimates based on features of a joint distribution are generated.

Figure 6:
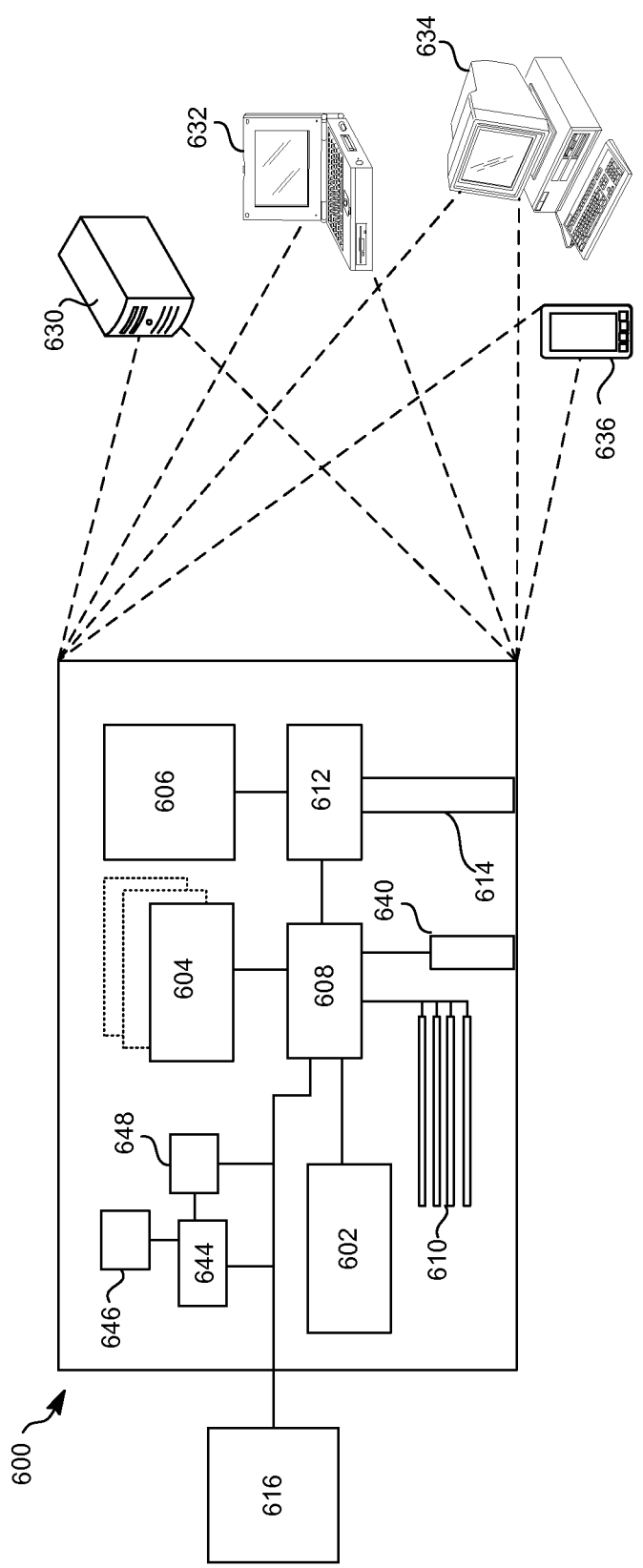
FIG. 6 shows an example of a computer device that can be used to implement the described techniques.
Figure 7:
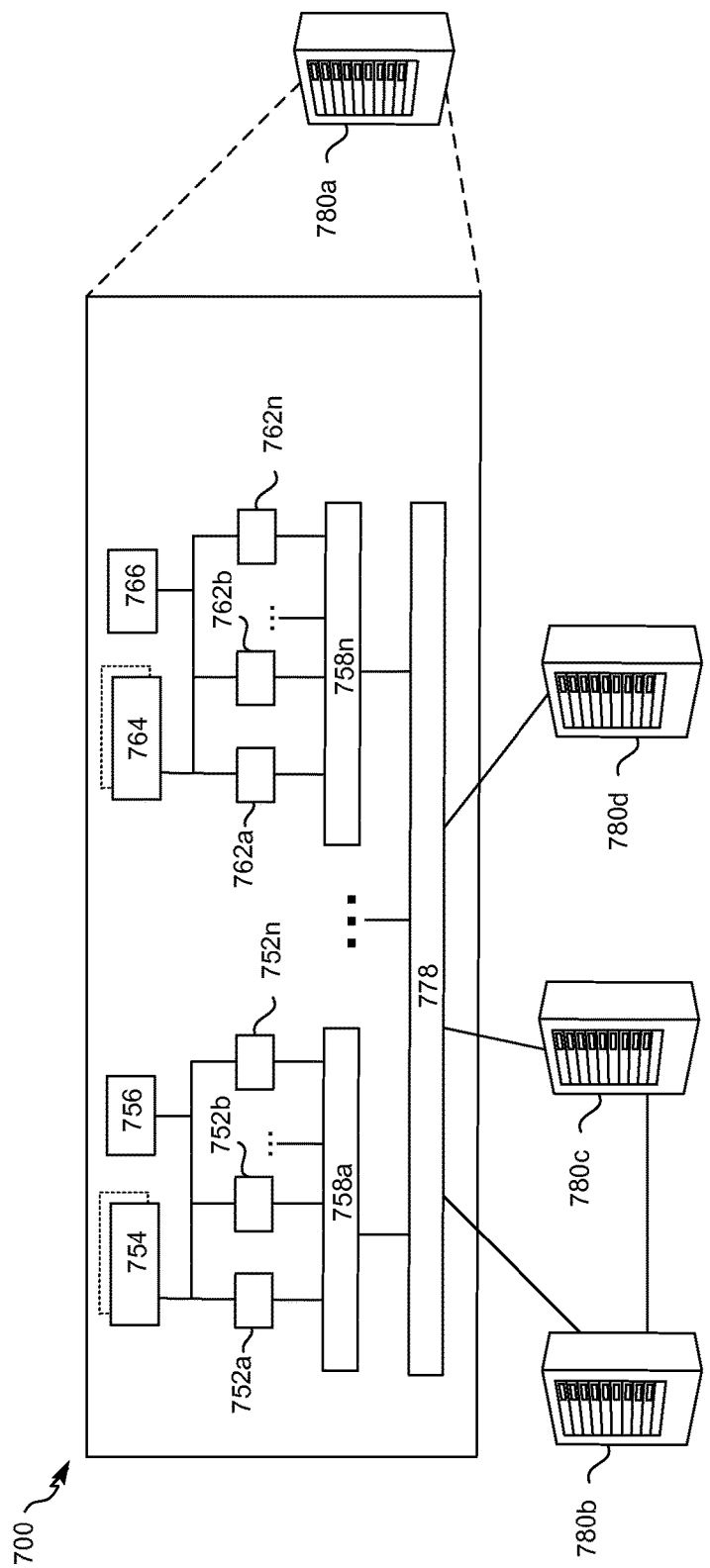
FIG. 7 shows an example of a distributed computer device that can be used to implement the described techniques.

The estimate explanation system 100 may be a computing device or devices that take the form of a number of different devices. For example, the system 100 may be a standard server, a group of such servers, a client-server system, or a rack server system. In addition, system 100 may be implemented in a personal computer, for example a laptop computer. The estimate explanation system 100 may be an example of computer device 600, as depicted in FIG. 6, or computer device 700, as depicted in FIG. 7.

The estimate explanation system 100 may include a data graph 124. The data graph 124 can be a directed edge-labeled graph. Such a data graph stores nodes and edges. The nodes in the data graph represent an entity, such as a person, place, item, idea, topic, abstract concept, concrete element, attribute of another entity, other suitable thing, or any combination of these. Entities in the data graph may be related to each other by edges, which represent relationships between entities. For example, the data graph may have an entity that corresponds to the person Zach Jones and the data graph may have a child relationship between the Zach Jones entity and entities representing the children of Zach Jones. Thus, the fact that Zach Jones has a child is recorded in the data graph in the form of entities and relationships between entities. The data graph may also store attributes for nodes, for example an edge of birthdate that links an entity with a date. The date may or may not be considered a separate node. This is another way the data graph may store facts. A data graph with a large number of entities and even a limited number of relationships may have billions of connections. In some implementations, data graph 124 may be stored in an external storage device accessible from system 100. In some implementations, the data graph 124 may be distributed across multiple storage devices and/or multiple computing devices, for example multiple servers.

Although not shown in FIG. 1, the estimate explanation system 100 can include one or more processors (e.g., silicon-based hardware processors) configured to execute one or more machine executable instructions or pieces of software, firmware, or a combination thereof. The estimate explanation system 100 can also include an operating system and one or more computer memories, for example, a main memory, cache, flash, or disk, configured to store one or more pieces of data, either temporarily, permanently, semi-permanently, or a combination thereof. The memory may include any type of storage device that stores information in a format that can be read and/or executed by the one or more hardware processors. The memory may include volatile memory, non-volatile memory, or a combination thereof, and store modules that, when executed by the one or more processors, perform certain operations. In some implementations, the modules may be stored in an external storage device and loaded into the memory of system 100.

The modules may include a search engine 110, a prediction engine 114, and an explanation engine 116, among others. The search engine 110 may search the graph-based data store 124 in addition to other document corpora in responding to a search request. For example, the search engine 110 may also be capable of searching a corpus of crawled documents 120 in addition to the data graph 124. Crawled documents 120 may include an index for searching for terms or phrases within a corpus of documents. In some implementations the corpus may be documents available on the Internet. Documents may include any type of file that stores content, such as sound files, video files, text documents, source code, news articles, blogs, web pages, PDF documents, spreadsheets, etc. In some implementations, crawled documents 120 may store one-dimensional posting lists that include phrases, terms, or document properties as posting list values and, for each posting list value, identifiers for documents related to the phrase or term. While an index for crawled documents 120 has been described as using posting lists, the index may have some other known or later developed format.

The system 100 may also include search records 122. Search records 122 may include search logs, aggregated data gathered from queries, or other data regarding the date/time and search terms of previously processed queries. In some implementations, the search records 122 may be generated by search engine 110 in the normal process of generating search results. The data graph 124, crawled documents 120, and search records 122 are stored on tangible computer-readable storage devices, for instance disk, flash, cache memory, or a combination of these, configured to store data in a semi-permanent or non-transient form. In some implementations graph-based data store 124, crawled documents 120, and search records 122 may be stored in a combination of various memories and/or may be distributed across multiple computing devices.

In some implementations, the system 100 may include an indexing engine (not shown) that includes one or more processors configured to execute one or more machine executable instructions or pieces of software, firmware, or a combination thereof to create and maintain data graph 124 and/or crawled documents 120, etc. The indexing engine may obtain content from, for example, one or more servers 190, and use the content to maintain data graph 124 and/or crawled documents 120. In some implementations, the servers 190 may be web servers, servers on a private network, or other document sources that are accessible by the indexing engine. The indexing engine may be one or more separate computing devices, such that graph-based data store 124 is maintained by a first set of computing devices and crawled documents 120 is maintained by a second set of computing devices, etc.

The search engine 110 may include one or more computing devices that use the data graph 124 and/or crawled documents 120 to determine search results for queries, for example, using conventional or other information retrieval techniques. Search engine 110 may include one or more servers that receive queries from a requestor, such as client 180, and provide search results to the requestor. Search results may include information from documents responsive to the query, information (e.g., facts) from relationships and entities in the data graph 124, and/or an estimate for information absent from the graph along with an explanation of the estimate. In some implementations, the search engine 110 may include a ranking engine that identifies documents responsive to the query from crawled documents 120 and calculates scores for the documents responsive to the query, for example, using one or more ranking signals. The ranking engine may rank the documents found responsive to the query using the scores.

In some implementations, the modules may include a prediction engine 114. The prediction engine 114 determines that requested information is missing from the data graph 124 and may provide an estimate for the missing information. The requested information may be requested in a query, or may be determined to of the type of information often requested in queries. For example, the prediction engine 114 may analyze search records 122 to determine what kinds of information query requestors have often requested in the past (e.g., like birthdates, spouses, song or movie release dates, etc.) and use this information to look for these facts in the data graph 124. Of course, the prediction engine 114 may also include other methods of finding missing facts, for example using an entity type to determine what attributes entities of the entity type have and look for missing attributes for entities of the entity type. For example, a person entity may have a birthdate, so the prediction engine 114 may look for entities that are people that are missing a birthdate, etc.

In some implementations, the prediction engine 114 may generate a prediction about missing information using a joint distribution model 126. The joint distribution model 126 may include features used to make a prediction about a particular fact or piece of information. A feature used for prediction represents a fact in the data store, often a relationship, between a target entity and a related entity, and an attribute of the related entity. For example, one feature for predicting a birthdate or age of a person may be the age of the person's spouse. Another feature for predicting a birthdate or age may be the age of the person's child. Another feature for predicting a birthdate may be a college graduation date. Each of these features may be associated with birthdate or age relationship, e.g., the missing relationship, in the model 126, so that if the prediction engine 114 finds a missing birthdate relationship, the prediction engine 114 may look for these related facts in the data graph 124. The prediction engine 114 may use the related facts to infer a value for the missing information. Each feature in the model 126 may have one or more statistical descriptors of the distribution, such as a statistical variance, moments, cumulants, etc., associated with the feature. In addition, the joint distribution over all features can be characterized by statistical descriptors, such as the vector mean, covariance matrix, and any other descriptors (e.g., median, minima, maxima, and high order moments) of the joint distribution. For example, for the birthdate features the variance may represent plus or minus a number of years. Thus, for example, the model 126 may indicate that a birthdate is plus or minus five years of the spouse's birthdate. The higher the variance, the weaker the evidence provided by the feature. Any conventional method of learning the distribution of features can be used. This can include, for example, defining a parametric function over pairs of variables and using maximum likelihood or method of moments, and/or non parametric methods. As another example, learning the models of distribution can also include belief propagation, of the graph of entities and interactions. "Counting Belief Propagation" by Kersting et al., Proceedings of the Twenty-Fifth Conference on Uncertainty in Artificial Intelligence (UAI-09), Montreal, Canada, June 2009 describes one such method. This can also include non parametric methods such as parzen windows, or binned histograms.

Figure 2:
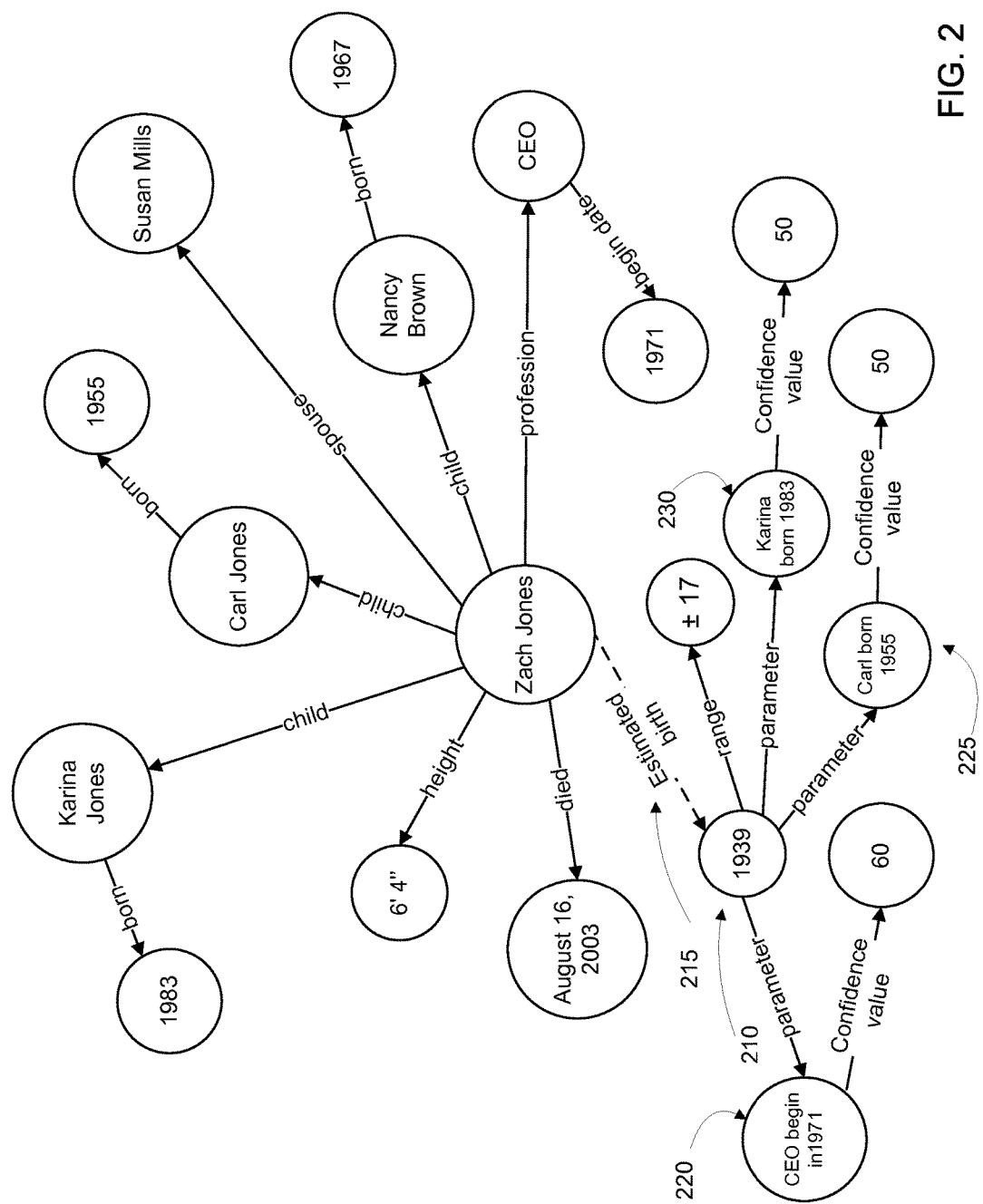
FIG. 2 illustrates an example of entities and relationships in a data graph.

In some implementations, the prediction engine 114 may run periodically, looking for missing information in the data graph 124 and generating a prediction for the missing information. In such implementations, the prediction engine 114 may store the prediction. In some implementations, the predictions and related information can be stored in a file or database. In some implementations, the prediction engine 114 may store the estimate and the features used to generate the estimate in the data graph 124 itself, or a separate data graph that links to the data graph 124. FIG. 2 illustrates an example of a (partial) data graph 124 with an estimate stored as an entity in the graph. In the example of FIG. 2, the entity Zach Jones is a person entity missing a birthdate. The prediction engine 114 may use the model 126 to determine that children's birthdates and the start of a presidential term are features that can be used to estimate the missing birthdate. Once the prediction engine 114 has generated an entity 210 that represents the estimate, it may link the entity 210 with a special relationship 215 to the Zach Jones entity. The special relationship may be an indication that the entity 210 is an estimate and not a verified birthdate. Of course, other methods may be used to indicate that the entity 210 is an estimate, for example, a specific entity type, or an attribute. The entity 210 may be associated with a number of attributes, such as a variance range, and the features used to generate the entity. In some implementations, the prediction engine 114 may store each feature used to generate the entity 210.

In some implementations, the prediction engine 114 may select only a subset of the features for storage, for example in the data graph 124. For example, the prediction engine 114 may select features it determines to be strong contributors to the estimate, or highly influential to the estimate. The stored features may then be used at a later time for inclusion in an explanation of the estimate. In some implementations, the prediction engine 114 may store all features used to generate the entity 210 and selection of the subset of features used in an explanation may be done at a later time, e.g., at query time.

In some implementations, the search engine 110 may include an explanation engine 116 that generates a human-readable explanation of the basis for estimated information provided as part of a search result in response to a query. The explanation engine 116 may determine that the query requests specific information for a particular entity and that the data graph 124 provides an estimate for the information. For example, the explanation engine 116 may determine that entity 210 is responsive to the query, or the explanation engine 116 may determine that the birthdate is missing and invoke the prediction engine 114 to estimate the birthdate. In some implementations, the explanation engine 116 may use the features selected by the prediction engine 114 to generate an explanation for the estimate. In some implementations, the explanation engine 116 may select the features used to generate the explanation. The quantity of features selected, either by the prediction engine 114 or the explanation engine 116, as the basis for the explanation may be minimized, to keep the explanation simple. The explanation engine 116 may use the selected features to generate a human-readable explanation for the estimate that identifies at least one basis (e.g., from a feature) of the estimate. In some implementations, the explanation engine 116 may use templates 130 to provide the human-readable explanation, although other methods can be used to translate the influential features into a human-readable explanation. The explanation engine 116 or the search engine 110 may provide the estimate and the explanation as part of a search result.

Estimate explanation system 100 may be in communication with client(s) 180 over network 160. Clients 180 may allow a user to submit queries to and receive a search result from search engine 110. Network 160 may be, for example, the Internet, or the network 160 can be a wired or wireless local area network (LAN), wide area network (WAN), etc., implemented using, for example, gateway devices, bridges, switches, and/or so forth. Via the network 160, the estimate explanation system 100 may communicate with and transmit data to/from clients 180. In some implementations, estimate explanation system 100 may be in communication with or include other computing devices that provide updates to the data graph 124 and/or to the crawled documents 120. For example, estimate explanation system 100 may include or be in communication with an indexing engine that crawls web server(s) 190 for documents and indexes the contents of the documents. The estimate explanation system 100 represents one example configuration and implementations may incorporate other configurations. For example, some implementations may combine one or more of the search engine 110, the prediction engine 114, and the explanation engine 116 into a single module or engine. As another example, elements of the search engine 110, the prediction 114 and the explanation engine 116 may be distributed across different computing devices. For example, the elements of the search engine 110 may be distributed across a root computing device and one or more servers that store the data graph 124 and/or the crawled documents 120.

Figure 3:
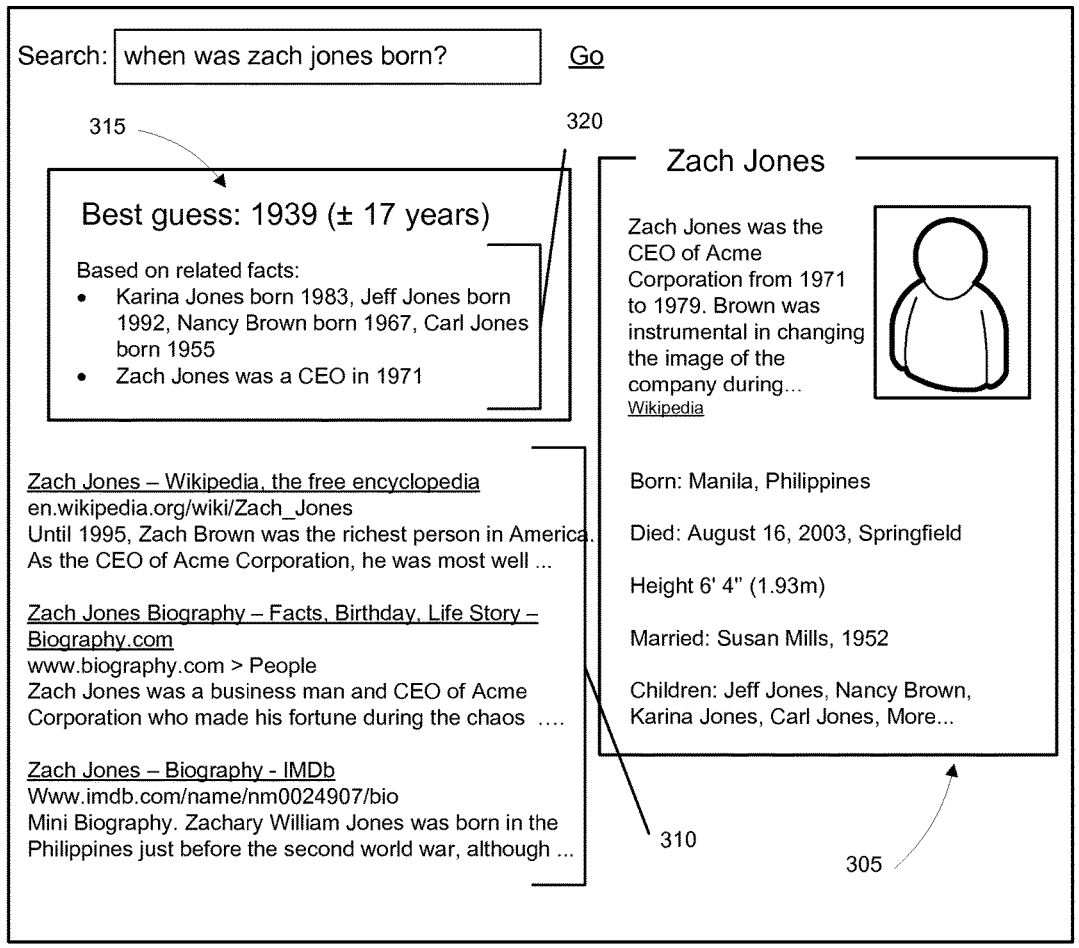
FIG. 3 illustrates an example of a user interface a search result enhanced with an estimate explanation, in accordance with an implementation.

FIG. 3 illustrates an example of a user interface 300 illustrating a search result enhanced with an estimate explanation, consistent with disclosed implementations. A search engine, such as search engine 110 of FIG. 1, may generate information used to display user interface 300 in responding to a request to show search results for a query that requests a specific piece of information about an entity (e.g., a target entity) in the graph-based data store. The user interface 300 may include search results 305 from the graph-based data store. Search results 305 may represent facts about the entity, but may not include the specific piece of information requested. In the example of FIG. 3, the query requested the birth date of Zach Jones, but the information from the data graph does not include this information. The user interface 300 may also include search result 310 from a document source. The search result 310 may thus represent documents determined to be responsive to the terms of the query.

In addition, user interface 300 may include estimate 315 and its explanation 320. The estimate 315 may be a prediction or inference of the missing value generated based on models of joint distribution of features, also known as belief propagation. However, the query requestor may not have any basis to trust an estimated answer. To provide a basis for believing, or disbelieving, the provided estimate and improve the user experience, the user interface 300 provides an explanation 320 of the basis for the estimate 315. As discussed herein, the explanation is based on the strongest features used to generate the estimate 315, e.g. those that are highly influential, have the highest contribution scores, etc.

In some implementations, to keep the explanation easier to understand, the system may seek to minimize the number of features included in the explanation. The features selected for the explanation may be an aggregate of similar features. For example, the contribution of the three children of Zach Jones may have been aggregated together, and their contribution scores combined, to determine if the aggregate provides stronger evidence, or is more influential, on the estimate.

Figure 4:
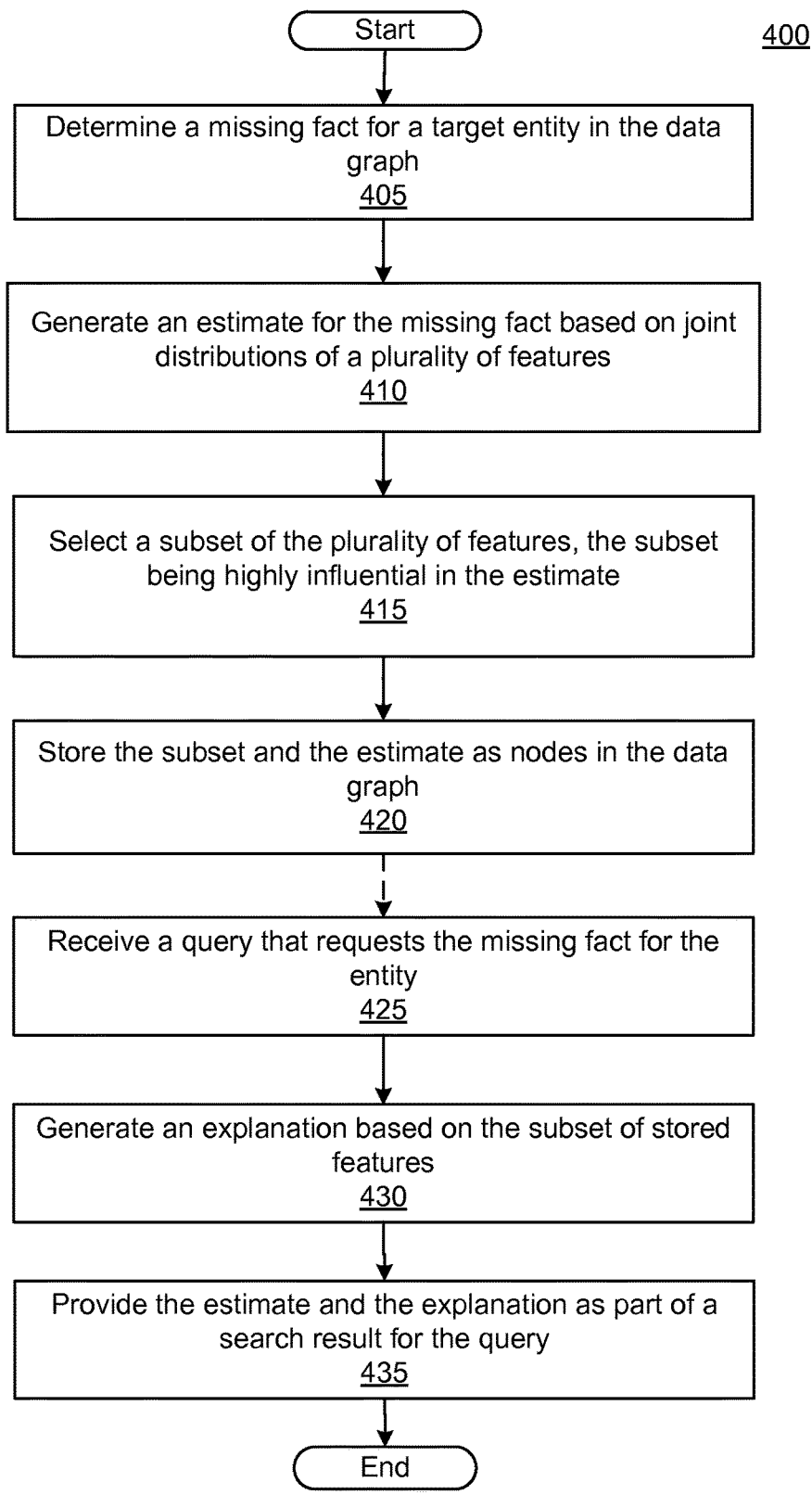
FIG. 4 illustrates a flow diagram of an example process for providing an estimate explanation, in accordance with an implementation.

FIG. 4 illustrates a flow diagram of an example process 400 for providing an estimate explanation, in accordance with an implementation. Process 400 may be performed by an estimate explanation system, such as system 100 of FIG. 1. Before process 400 may begin, the system may have received and/or learned models of joint distribution for various relationships in a data graph. As explained above, each model, one for each potentially missing relationship, may have one or more features. Each feature may represent related facts in the data store that help make an inference about the missing information. Once the model is established, the system may use the model to estimate missing information and provide an explanation of the estimate.

Process 400 may begin when the estimate explanation system determines that a fact for a target entity is missing from the data graph (405). In some implementations, the estimate explanation system may determine the fact is missing during the process of generating a response to a query that requests the fact. In some implementations, the estimate explanation system may determine that the fact is missing as part of a periodic process. For example, a prediction engine of the estimate explanation system may periodically inspect search records for facts requested by past queries, and then check for those facts for entities in the data graph. As another example, the prediction engine may use entity type attributes, e.g., facts that entities of a particular type are known to have, to look for entities of that type missing the attribute. For example, albums and movies are known to have release dates, so the prediction engine may look for albums or movies that do not have release dates. Similarly, people are known to have birthdates and the prediction engine may look for person entities without birthdates. In some implementations, the prediction engine may look for missing facts (e.g., relationships) that have an associated model in the joint distribution models. In some implementations, the estimate explanation system may incorporate signals other than signals from the data graph, for example facts extracted from web pages, etc.

In response to determining that the target entity is missing the fact, the system may generate an estimate for the missing fact based on a plurality of joint distributions of features (410). The features may represent related entities and attributes from the data graph that participate in generating the inference for the missing information. The estimate may be based on the evidence provided by a combination of the features, sometimes tens or hundreds of features, as is known. In some implementations, the estimate explanation system may select a subset of the features that are deemed highly influential to the estimate (415). The system may use a variety of methods to determine which features are included in the subset, as explained herein with regard to FIG. 5. In some implementations, the system may seek to minimize the quantity of features in the subset. In some implementations, the quantity may have a predetermined limit, so that no more features than the predetermined limit are included in the subset. In some implementations, the system may store the features selected for the subset and the estimate (420). In some implementations, the system may store the features and the estimate as nodes in the data graph. When stored as nodes, the entity representing the estimate may have an indication that it is an estimate, such as a special entity type, or a special relationship between the estimate entity and the target entity in the data graph. For example, entity 210 of FIG. 2 illustrates an example of an estimate entity that is related to the target entity Zach Jones by a special relationship. The features used to generate the estimate may also be stored in the data graph, as illustrated in FIG. 2 by entities 220, 225, and 230.

At some point in time the system may receive a query that requests the missing fact for the entity (425). In some implementations, this is independent of generating the estimate for the missing fact, which occurred earlier in time. In some implementations, receipt of the query may be the trigger that causes the system to generate the estimate and select the subset of features (e.g., perform steps 405 to 415). When the estimate is determined ahead of time, the system may find the estimate in the data graph, along with subset of features that are highly influential to the estimate. The system may generate an explanation for the estimate based on the subset of features (430). In some implementations, the explanation may be a bulleted list of the features selected for the subset. In some implementations, the system may include a template for the various features. For example, a template may exist for the various relationships in the graph. Thus, if one feature used to estimate a person's age is the age of his or her spouse, the system may have a "spouse template" that has markers or variables that indicate where data values go. For example, the "spouse template" for an age estimate may be "The estimated age of X is based on the age of a spouse" or something similar.

The system may provide the estimate and the explanation as part of a search result for the query (435). For example, the estimate and explanation can be provided alone, with other facts about the entity from the data graph (e.g., results 305 of FIG. 3), and/or with documents found responsive to the query (e.g., result 310 of FIG. 3), the documents including web pages, PDF, videos, sound files, etc., considered responsive to the query. In some implementations, the estimate and its explanation may be placed in a position of prominence within the search result, such as ahead of responsive web pages or other documents. Process 400 then ends, having provided an explanation for an estimate of information missing from a data graph.

There may be, of course, some instances where a fact requested in the query has no estimate, for example because the joint distribution model does not have a model for the fact, because information for related facts is missing, etc. In such situations because no estimate is provided, there is no explanation for the estimate. Process 400 is thus intended to be performed for missing facts for which an estimate is capable of being generated.

Of course, various modifications to the steps of process 400 may be made. For example, the system may store all features used to generate the estimate and may select the subset of features used in the explanation (415) after receiving the query. As another example, the system may skip step 420 and may generate the estimate and select the subset of features in response to receipt of the query. Other modifications to process 400 are also contemplated.

Figure 5:
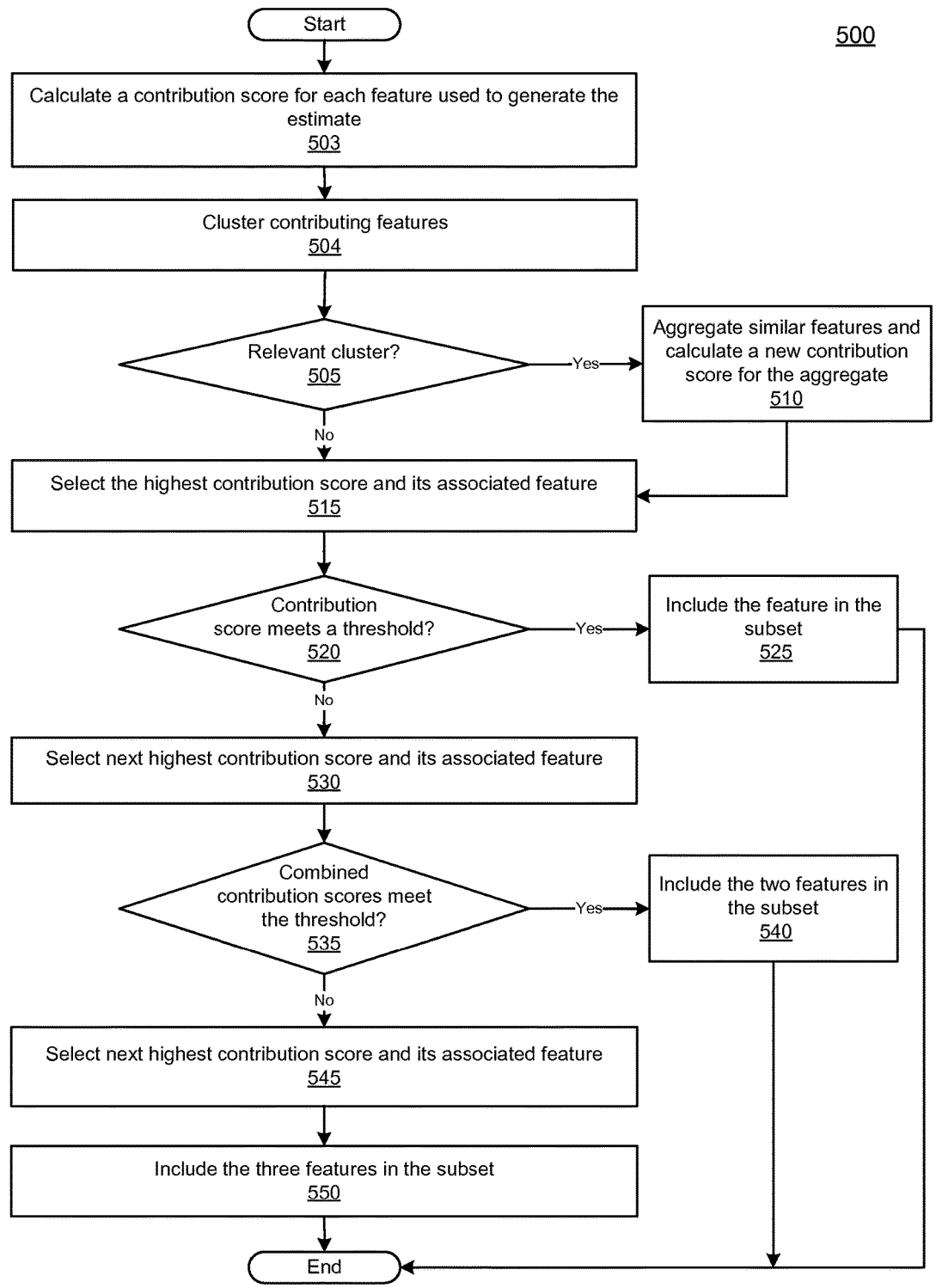
FIG. 5 illustrates a flow diagram of an example process for determining influential features used to determine an estimate, according to an implementation.

FIG. 5 illustrates a flow diagram of an example process for determining influential features used to determine an estimate, according to an implementation. Process 500 may be performed by an estimate explanation system, such as system 100 of FIG. 1, as part of step 415 of FIG. 4. Process 500 determines which features, e.g., which related entities and relationships, are most influential in generating the estimate. In some implementations, it is these features that are used to generate the explanation. The system may balance the number of features selected as influential with the goal of providing features with sufficient confidence.

Process 500 may begin by calculating a contribution score for each feature used to generate the estimate (503). For example, to compute the contribution score of a particular feature the system may compare the estimate with a second estimate. The second estimate may be generated without the use of the particular feature. If the second estimate differs significantly from the original estimate, the particular feature is a high influencer, and the system may assign the particular feature a high contribution score. If there is no difference the system may assign a zero or other low contribution score to the feature. Thus, the contribution score may reflect the magnitude of the difference. As another example, the system may look at the variance associated with the feature. If the variance is high, the contribution score may be low. Thus, for example, when determining an age of a person, the system may assign a low contribution score to a feature with a variance of 50 years, and a high contribution score to a feature with a variance of 3 years. The variance may be related to how closely related the entity for a particular feature is to the target entity, or in other words the entity that is missing the fact. The less related the two entities are (e.g., a child or spouse is a close relation, while a person living in the same country is a distant relation), the lower the contribution score. Some implementations may use a combination of these to determine the contribution score. Some implementations may use a weighted mean that accounts for variance.

The system may then cluster the contributing features based on common factors, such as some close-set in the graph (504). For example, the graph might have an edge of "longevity" with three enumerated values, e.g., low, medium, and high. As another example, the system may cluster features with a similar numerical value, such as age, height, width, etc. The system may use non-numerical values, such as ethnicity or state of residence, to cluster the features. The clustering may enable the system to generate one or more aggregated features. Sometimes, the estimate may be based on numerous similar features that, by themselves are weak contributors but together are strong. For example, if the height of a person is unknown, the average height of people living in the same country may provide a good estimate of the height of the person where the height of one person would not. Likewise, clustering the entity for which a fact is missing with other entities having a similar attribute, such as the longevity value, can help in estimating the missing fact. Thus, if the entity has a longevity value of "short", the system may use the lifespan of other entities with a longevity value of "short" to determine a date of death. In some implementations, the system may determine which of the clusters are most relevant (505) and the system may aggregate the similar features (e.g., average the height of people living in the same vicinity) and calculate a new contribution score for the aggregate feature (510). In some implementations, the new contribution score may represent the sum or weighted sum of the contribution scores of the similar feature In some implementations, the aggregate feature may be generated for all clusters. Thus, the system may repeat step 510 for multiple clusters. The aggregate feature and its contribution score are considered, once generated, to be included in the features used to generate the estimate.

The system may inspect the features and select one that has a highest contribution score (515). As indicated above, the feature with the highest contribution score can be an aggregate feature. If the highest contribution score meets a threshold (520, Yes), the system may use the selected feature for inclusion in the subset of highly influential features (525). Because the threshold was met, the subset has one feature, and the explanation of the estimate will be based on the single selected feature. If the contribution score does not meet a threshold (520, No), the system may select a feature with a second-highest contribution score (530). If the combination of the two contribution scores (the highest and the second-highest) meets the threshold (535, Yes), the system may include the two features in the subset (540), which is used to generate an explanation. If the combined contribution scores do not meet the threshold (535, No), the system may select a third feature with a third-highest contribution score (545). In some implementations, the three features are included in the subset (550) and process 500 ends, having selected the most influential features. In such implementations, the system is configured to provide at most three features in the explanation. In some implementations, the system may select more than three features for the subset. In such implementations, the system may continue to test the combination of the contribution scores against the threshold, stopping when the combined scores meet the threshold or when the maximum quantity of features is reached.

FIG. 6 shows an example of a generic computer device 600, which may be operated as system 100, and/or client 170 of FIG. 1, which may be used with the techniques described here. Computing device 600 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, e.g., a silicone-based hardware processor, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a personal computer such as a laptop computer 622, or smart phone 636. An entire system may be made up of multiple computing devices 600 communicating with each other. Other configurations are possible.

FIG. 7 shows an example of a generic computer device 700, which may be system 100 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 700.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 700 may include other components not shown, such as controllers, buses, input/output devices, communications modules, etc.

An entire system, such as system 100, may be made up of multiple computing devices 700 communicating with each other. For example, device 780a may communicate with devices 780b, 780c, and 780d, and these may collectively be known as system 100. As another example, system 100 of FIG. 1 may include one or more computing devices 700. Some of the computing devices may be located geographically close to each other, and others may be located geographically distant. The layout of system 700 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
    determining, using at least one processor, that information for an entity is absent from a data graph;
    determining, using the at least one processor, an estimate for the information based on a plurality of features from a joint distribution model related to the information;
    adding the estimate to the data graph so that the estimate is linked to the entity via a relationship indicating that the estimate is not verified;
    selecting a subset of the plurality of features, wherein the subset is a first subset and selecting the subset includes: determining a contribution value for each of the plurality of features; determining that a second subset of the features are related based on clustering the entity for which the information is missing with other entities having a similar feature; aggregating the features in the second subset to generate an aggregate feature; aggregating the contribution values for the features in the second subset to generate a new contribution score; and selecting the second subset as the first subset;
    for each feature in the subset of the plurality of features: adding the feature in the data graph, and linking the feature to the estimate;
    receiving, using the at least one processor, a query that requests the information for the entity;
    generating an explanation based on the subset of features linked to the estimate in the data graph, wherein the explanation and the estimate are based on the aggregate feature and the new contribution score; and
    providing the explanation and the estimate as part of a search result for the query.

2. The method of claim 1, wherein selecting the subset includes:
    selecting a feature with a highest contribution value when the highest contribution value meets a threshold; and
    selecting a quantity of features with highest contribution values when a combination of the contribution values meets the threshold.

3. The method of claim 2, wherein determining the contribution value for a particular feature includes:
    determining a first estimate for the information using the particular feature;
    determining a second estimate for the information without using the particular feature; and
    determining a difference between the first estimate and the second estimate.

4. The method of claim 2, wherein the contribution value for a particular feature is related to a statistical descriptor associated with the particular feature.

5. The method of claim 1, wherein the query is received prior to determining that the information is absent, and the determining is performed in response to receiving the query.

6. The method of claim 1, further comprising:
    analyzing search records to determine that the information has previously been requested for other entities; and
    determining whether the information is absent for the entity in response to determining that the information has previously been requested.

7. A computer program product tangibly embodied in a non-transitory storage medium, the computer program product including instructions that when executed cause a processor to perform operations including:
    determining, using at least one processor, that information for an entity is absent from a data graph;
    determining, using the at least one processor, an estimate for the information based on a plurality of features from a joint distribution model related to the information;
    adding the estimate to the data graph so that the estimate is linked to the entity via a relationship indicating that the estimate is not verified;
    selecting a subset of the plurality of features, wherein the subset is a first subset and selecting the subset includes: determining a contribution value for each of the plurality of features; determining that a second subset of the features are related based on clustering the entity for which the information is missing with other entities having a similar feature; aggregating the features in the second subset to generate an aggregate feature; aggregating the contribution values for the features in the second subset to generate a new contribution score; and selecting the second subset as the first subset;
    for each feature in the subset of the plurality of features: adding the feature in the data graph, and linking the feature to the estimate;
    receiving, using the at least one processor, a query that requests the information for the entity;
    generating an explanation based on the subset of features linked to the estimate in the data graph, wherein the explanation and the estimate are based on the aggregate feature and the new contribution score; and
    providing the explanation and the estimate as part of a search result for the query.

8. The computer program product of claim 7, wherein selecting the subset includes:
    selecting a feature with a highest contribution value when the highest contribution value meets a threshold; and
    selecting a quantity of features with highest contribution values when a combination of the contribution values meets the threshold.

9. The computer program product of claim 8, wherein determining the contribution value for a particular feature includes:
    determining a first estimate for the information using the particular feature;
    determining a second estimate for the information without using the particular feature; and
    determining a difference between the first estimate and the second estimate.

10. The computer program product of claim 8, wherein the contribution value for a particular feature is related to a statistical descriptor associated with the particular feature.

11. The computer program product of claim 7, wherein the query is received prior to determining that the information is absent, and the determining is performed in response to receiving the query.

12. The computer program product of claim 7, further comprising:
analyzing search records to determine that the information has previously been requested for other entities; and
determining whether the information is absent for the entity in response to determining that the information has previously been requested.

13. A system comprising:
a processor; and
a computer program product tangibly embodied in a non-transitory storage medium, the computer program product including instructions that when executed cause the processor to perform operations including:
determining, using at least one processor, that information for an entity is absent from a data graph;
determining, using the at least one processor, an estimate for the information based on a plurality of features from a joint distribution model related to the information;
adding the estimate to the data graph so that the estimate is linked to the entity via a relationship indicating that the estimate is not verified;
selecting a subset of the plurality of features, wherein the subset is a first subset and selecting the subset includes: determining a contribution value for each of the plurality of features; determining that a second subset of the features are related based on clustering the entity for which the information is missing with other entities having a similar feature; aggregating the features in the second subset to generate an aggregate feature; aggregating the contribution values for the features in the second subset to generate a new contribution score; and selecting the second subset as the first subset;
for each feature in the subset of the plurality of features:
adding the feature in the data graph, and linking the feature to the estimate;
receiving, using the at least one processor, a query that requests the information for the entity;
generating an explanation based on the subset of features linked to the estimate in the data graph, wherein the explanation and the estimate are based on the aggregate feature and the new contribution score; and
providing the explanation and the estimate as part of a search result for the query.

14. The system of claim 13, wherein selecting the subset includes:
selecting a feature with a highest contribution value when the highest contribution value meets a threshold; and
selecting a quantity of features with highest contribution values when a combination of the contribution values meets the threshold.

15. The system of claim 14, wherein determining the contribution value for a particular feature includes:
determining a first estimate for the information using the particular feature;
determining a second estimate for the information without using the particular feature; and
determining a difference between the first estimate and the second estimate.

16. The system of claim 14, wherein the contribution value for a particular feature is related to a statistical descriptor associated with the particular feature.

17. The system of claim 13, wherein the query is received prior to determining that the information is absent, and the determining is performed in response to receiving the query.

18. The system of claim 13, further comprising:
analyzing search records to determine that the information has previously been requested for other entities; and
determining whether the information is absent for the entity in response to determining that the information has previously been requested.

* * * * *